US009330311B1

(12) United States Patent
Elancheralathan

(10) Patent No.: US 9,330,311 B1
(45) Date of Patent: May 3, 2016

(54) OPTICAL CHARACTER RECOGNITION

(71) Applicant: Amazon Technologies, Inc., Reno, NV (US)

(72) Inventor: Vasanth Elancheralathan, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 25 days.

(21) Appl. No.: 14/307,319

(22) Filed: Jun. 17, 2014

(51) Int. Cl.
*G06K 9/62* (2006.01)
*G06K 9/00* (2006.01)

(52) U.S. Cl.
CPC ........ *G06K 9/00456* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,034,991 A * | 7/1991 | Hagimae | ............... | G06K 9/3283 382/171 |
| 5,042,073 A * | 8/1991 | Collot | ................ | G06K 9/00154 382/123 |
| 5,237,627 A * | 8/1993 | Johnson | ................... | G06K 9/48 382/198 |
| 5,909,500 A * | 6/1999 | Moore | ................ | G07C 9/0015 382/123 |
| 6,345,119 B1 | 2/2002 | Hotta et al. | | |
| 7,454,063 B1 * | 11/2008 | Kneisl | ................ | G06K 9/00872 382/176 |
| 2007/0115373 A1 | 5/2007 | Gallagher et al. | | |
| 2011/0103713 A1 * | 5/2011 | Meyer | ................ | G06K 9/00859 382/321 |
| 2012/0308127 A1 * | 12/2012 | Kudoh | ................ | G06K 9/4652 382/165 |

OTHER PUBLICATIONS

Kae et al. "Improving State-of-the-Art OCR through High-Precision Document-Specific Modeling", IEEE Conference on Computer Vision and Pattern Recognition (2010), pp. 1-8.
Rigaud et al. "Automatic text localisation in scanned comic books", 9th International Conference on Computer Vision Theory and Applications, Feb. 2013, Barcelona, Spain; pp. 1-7.
Tian et al, "Toward a Copmputer Vision-based Wayfinding Aid for Blind Persons to Access Unfamiliar Indoor Environments", Machine and Vision Applications, Apr. 2012, pp. 1-25.
USPTO, Office Action for U.S. Appl. No. 14/307,323, mailed Oct. 27, 2015.

* cited by examiner

*Primary Examiner* — Brian P Werner
(74) *Attorney, Agent, or Firm* — Lowenstein Sandler LLP

(57) ABSTRACT

Systems and methods for analyzing letters in an image of text are described. For each letter, a number of properties are determined and the letters are classified into letterform classes. The properties may include independent letter properties based on only the letter itself, such as a slanted bounding box encompassing the letter. The properties may also include dependent letter properties that are based, in part, on other letters, such as adjacent letters or letters in the same word or line.

20 Claims, 12 Drawing Sheets

OPTICAL CHARACTER RECOGNITION

BACKGROUND

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like.

Converting the content of a physical book into a digital format for such consumption may be a time-consuming process. In some instances, the content may be inaccurately converted, particularly when letters of text are arranged without clear grid-based demarcations such as when text is italicized or when certain fonts are used.

DETAILED DESCRIPTION

Figure 1:
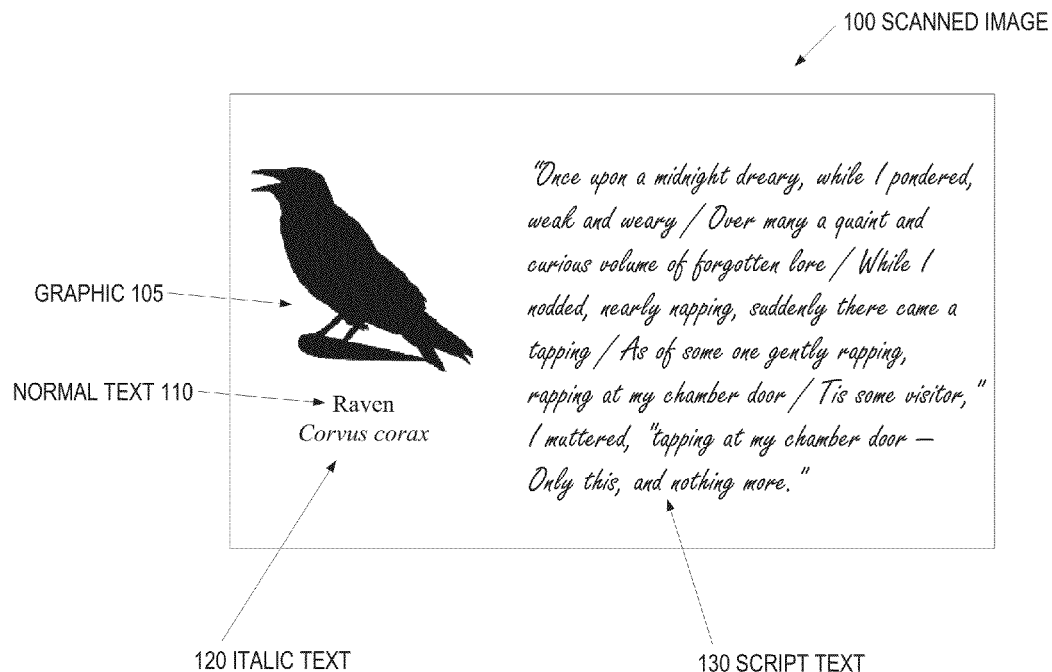
FIG. 1 is an embodiment of a scanned image of a portion of a physical book.

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like.

Converting the content of a physical book into a digital format for such consumption may be a time-consuming process. In some instances, the content may be inaccurately converted, particularly when letters of text are arranged without clear grid-based demarcations such as when text is italicized or when certain fonts are used.

Described herein are systems and methods for analyzing an image of text and determining, for each letter of the text, a character that the letter represents or a representative shape of the letter. By replacing the image with a series of character codes that reference characters or a series of shape codes that reference representative shapes (e.g., replacing an image file with a text file), the size of the file may be drastically reduced while the content of the image is retained.

The image is analyzed to recognize the letters in the image and, for each letter, a number of letter properties are determined. The letter properties may include independent letter properties that do not depend on other letters. The independent letter properties may include letter shape properties, such as values defining a slanted bounding box encompassing the letter. The letter properties may include dependent letter properties that depend on other letters, such as adjacent letters or letters in the same word or line.

The letter properties of each letter are used to classify the letter into letterform classes. In one embodiment, the classification is language-agnostic; the letterform classes are not known a priori, but are generated as part of the classification. In one embodiment, the letters are classified through an iterative process. For example, the letters may be classified into initial letterform classes which are, themselves, grouped into initial letterform class groups. Through analysis of the similarity of the classes and groups, they may be merged or split until a set of final letterform classes are formed.

Once the final letterform classes have been determined, and the letters classified into the final letterform classes, the letterform classes may be used to generate a representative shape. The representative shape may be put through a standard OCR (optical character recognition) process to determine the character corresponding to the letterform class (and, thus, the letters in the class).

FIG. 1 is an embodiment of a scanned image 100 of a portion of a physical book. The scanned image includes textual content of the physical book as well non-textual content. The non-textual content includes a graphic 105. In other images, the non-textual content may include noise, dividing lines, ornamentation, or other non-textual elements. The textual content includes normal text 110, italic text 120 (also referred to as italics), and script text 130 (also referred to as script). Italic text may include slanted text, whereas script text may include text designed to resemble handwriting that may or may not be slanted. In other images, the textual content may include bold text, small caps text, non-English text, non-Roman-alphabet text, or other textual elements.

Whereas the letters of the normal text 110 are generally separable by vertical lines (e.g. a rectangular grid), the italic text 120 and script text 130 may not be separable by vertical lines. Although the letters of the italic text 120 and script text 130 are generally distinct ink closures, e.g., the letters do not touch for the most part, the tops of some letters overhang or are vertically over the bottoms of adjacent letters. This complicates separation of the image into distinct image segments, each image segment containing all of a single letter and none of any other. Whereas separation into image segments of normal text 110 may be performed using a set of boxes, such an approach with italic text 120 or script text 130 (or other such non-grid-based, slanted, or unrestrained text) may lead to poor performance and inaccurate output.

Normal text 110 may be easily separated into image segments representing individual letters and each image segment independently analyzed to determine the character the letter represents. However, italic text 120 and script text 130 (or other types of text) may not be amenable to such processing. Thus, normal text 110 may be referred to as gridable or grided text, whereas other types of text such as italic text 120 or script text 130 may be referred to as ungridable or gridless text. Thus, in one embodiment, italic text 120 and script text 130 are recognized as letters by detecting ink closures and without using a grid. In one embodiment, letters of text may be analyzed in view of other letters such as adjacent letters and/or letters in the same line of text.

Figure 2:
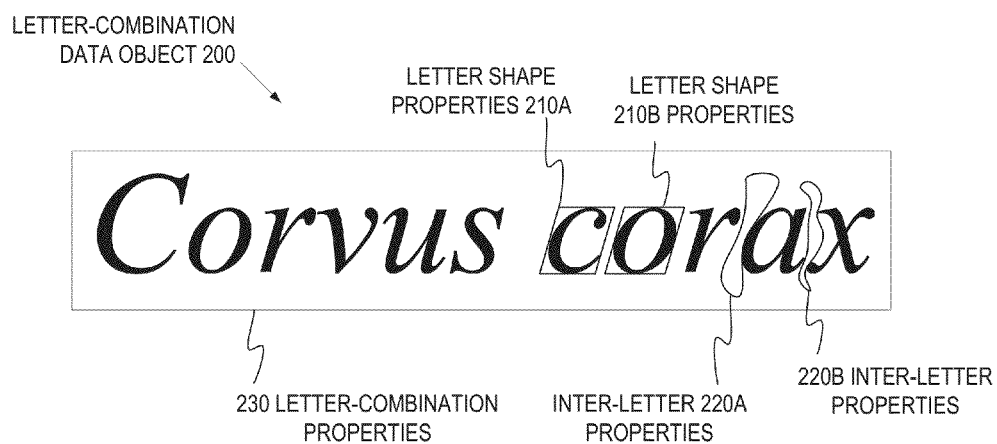
FIG. 2 is a diagrammatic representation of an embodiment of a letter-combination data object.

FIG. 2 is a diagrammatic representation of an embodiment of a letter-combination data object 200. The letter-combination data object stores information regarding a sequence of letters referred to as a "letter-combination." A letter-combination may correspond to a word (e.g., "Raven"), multiple words (e.g., "*Corvus corax*" or "a midnight dreary"), or a line of text (e.g., "curious volume of forgotten lore/While I"). The letter-combination data object may include a list of letter data objects (or a linked list referring to letter data objects).

The letter data objects may include information regarding letter shape properties 210A-210B. Letter shape properties may include measures of the shape of a letter. Thus, at least by reference, the letter-combination data object includes information regarding letter shape properties 210A-210B for each of the letters of the letter-combination. The letter shape properties 210A-210B may include a slanted bounding box that encompasses each letter. Additional letter shape properties are described in detail below with respect to FIG. 4.

The letter-combination data object may include information regarding inter-letter properties 220A-220B. Inter-letter properties may include measures of the space between two sequential letters. The letter-combination data object may include multiple sets of inter-letter properties, one for each space between sequential letters. Thus, if there are N letters, there letter-combination data object may include information regarding N−1 sets of inter-letter properties. The inter-letter properties 220A-220B may include a minimum horizontal distance between the two letters. Additional inter-letter properties are described in detail below with respect to FIG. 5.

The letter-combination data object may include information regarding letter-combination properties 230. Letter-combination properties may include measures of a letter-combination as a whole. The letter-combination properties may include a length of the letter-combination. Additional letter-combination properties are described in detail below with respect to FIG. 6.

Figure 3:
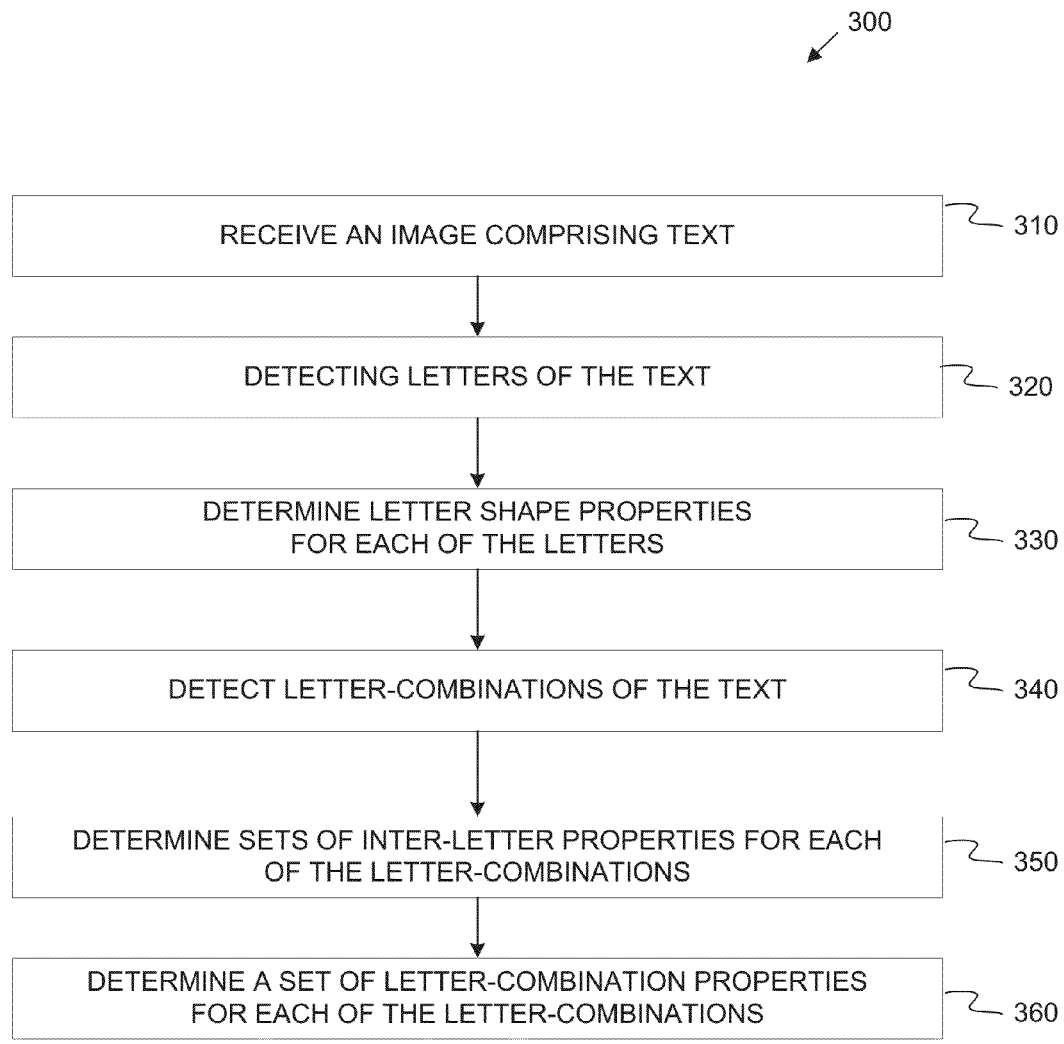
FIG. 3 is a flowchart illustrating an embodiment of a method of generating letter properties.

FIG. 3 is a flowchart illustrating an embodiment of a method 300 of generating letter properties. The method 300 may be performed by processing logic that may include hardware (e.g., circuitry, dedicated logic, programmable logic, microcode, etc.), software (e.g., instructions executed by a processing device), firmware or a combination thereof. For example, the method 300 may be performed by the processing device 1302 of FIG. 13, described below. It is to be appreciated that the method 300 may be performed for any number of images consecutively or concurrently. However, for ease of reference, the method 300 is described for a single image in FIG. 3.

At block 310 of method 300, the processing logic receives an image file representing an image comprising text. The text includes multiple words and each word includes one or more letters. Each of the letters is a representation of a letterform. For example, the word "coffee" includes six letters: a "c", an "o", a first "f", a second "f", a first "e", and a second "e". However, the word "coffee" only includes four letterforms: "c", "e", "f", and "o". Stated another way, "coffee" is a six-letter word, but requires only four different shapes to represent it. Thus, a letter corresponds to a particular feature of the image and a letterform corresponds to a general shape that particular letters may have.

As used herein, a letter may be an instance of any character or glyph, including alphabetic letters (such as "a", "b", "c", "π", "Ж" or "ל"), numbers (such as "0", "1", "2"), ligatures (such as "æ" or """), symbols (such as "$", "#" or "¶"), syllabograms (such as Japanese katakana), or logograms (such as Japanese kanji). A letter may be an instance of other typographical shapes than those mentioned above.

A letterform may be a particular shape for a character. For example, a first letterform may be "x" (lowercase x), a second letterform may be "X" (uppercase X), and a third letterform may be "*x*" (italic x). Each of the three different letterforms may be different shapes of the same character, e.g., three variants of the character "x", the 24th letter-of-the-alphabet.

Although many of the embodiments described below are discussed and illustrated with respect to the Roman alphabet, it is to be appreciated that other character sets may be used, including but not limited to Greek, Hebrew, Cyrillic, Arabic and Asian character sets such as hiragana, katakana and kanji.

The received image may be generated by imaging a physical page of a book or a portion thereof. For example, the image may be generated using a scanner or a camera. The image may be generated by imaging other text sources or generated by other methods. The image may be a two-dimensional matrix of pixels, referred to as a bitmap, each of the pixels having a value corresponding to its brightness. The image may be other image types.

At block 320, the processing logic detects a plurality of letters of the text. The processing logic may detect the plurality of letters by determining a plurality of portions of the image respectively corresponding to the plurality of letters. In one embodiment, the processing logic detects the letters by determining an origin location in the image for each of the letters. In another embodiment, the processing logic detects the letters by determining, for each of the letters, different segment of the image (e.g., a polygonal or other portion of the image) that corresponds to the letter.

In one embodiment, the processing logic detects the letters by detecting ink closures. Each ink closure may be a portion of the image having a set of contiguous pixels with a brightness value below an ink-presence threshold that are surrounded by a pixels with brightness value above a ink-absence threshold (which may be the same or different from the ink-presence threshold). Ink closures may be defined in other ways.

In one embodiment, the processing logic, in detecting the letters, also detects noise, graphics, non-letter symbols (e.g., dividing lines or ornamentation), or other elements. Thus, at block 320, the processing logic may detect a detection set that includes the letters of the text and non-letter elements. It is to be appreciated that while the detection set includes a plurality of letters, the detection set may not include all of the letters of the text. For example, the processing logic may inadvertently fail to detect one or more of the letters. As another example, the processing logic may intentionally not detect certain letters (e.g., those smaller than a certain size or those at the margins of the image).

At block 330, the processing logic determines a set of letter shape properties for each of the detected letters. The letter shape properties may be measures of the shape of the letter. The letter shape properties may include definitions of boxes surrounding salient portions of the letter, including the body and/or protrusions. The letter shape properties may include definitions of lines conforming to edges of the letter. The letter shape properties may include a slant angle of the letter. Specific letter shape properties and methods of determining the letter shape properties are described in further detail below with respect to FIG. 4.

As noted above, the processing logic, in detecting the letters, may also detect non-letter elements. At block 330, the processing logic may determine a set of shape properties for these non-letter elements in addition to determining the letter shape properties for the letters. Based on the shape properties, the processing logic may determine which elements of the detection set are letters and which are non-letter elements. Based on this determination, the processing logic may discard the non-letter elements and continue the method 300 using only letters and corresponding letter shape properties.

The processing logic may store the letter shape properties of the letters in a data object associated with the letter. Thus, in detecting the letters of the text, the processing logic may generate a set of letter data objects, each of the letter data objects associated with a letter of the text. Each of the letter data objects may include a location data field storing one or more values representing the location of the letter (e.g., an origin location or a definition of the portion of the image of the letter). Each of the letter data objects may further include a letter shape property array including a number of fields for storing a number of values representing the shape of the letter.

At block 340, the processing logic detects a plurality of letter-combinations of the text. The letter-combinations are sequence of letters of the text. Thus, a letter-combination of the text may correspond to a word of the text or may correspond to a line of text comprising multiple words. The processing logic may detect letter-combinations by analyzing the locations and letter shape properties of the letters. In particular, the processing logic may determine that two letters are sequential letters in a letter-combination when the vertical locations of the letters are substantially similar and the horizontal locations of the letters are separated by spacing substantially similar to a letter-width of one of the letters. The processing logic may detect letter-combinations based on other letter shape properties or using other methods.

In response to detecting the letter-combinations, the processing logic may generate a plurality of letter-combination data objects, each of the letter-combination data objects associated with a letter-combination of the text. Each of the letter-combination data objects may include a linked list data structure referencing a sequence of the letter data objects (which corresponds to a sequence of letters).

At block 350, the processing logic determines sets of inter-letter properties for each of the letter-combinations. As mentioned above, each of the letter-combinations is a sequence of letters. The inter-letter properties may be measures of the space between two sequential letters. The inter-letter properties may include a minimum horizontal distance between the two sequential letters. The inter-letter properties may include a distance between stems of the two sequential letters. Specific inter-letter properties and methods of determining the inter-letter properties are described in further detail below with respect to FIG. 5.

If a letter-combination includes a sequence of N letters, the processing logic may determine N–1 sets of inter-letter properties for that letter-combination. The sets of inter-letter properties may be included in a set of inter-letter properties arrays of the corresponding letter-combination data object. Each inter-letter properties array may be associated the corresponding letter data objects. Thus, each letter is associated with (1) letter shape properties and (2) one or two sets of inter-letter properties. A letter at the beginning or end of a letter-combination may only be associated with one set of inter-letter properties, whereas a letter in the middle of a letter-combination may be associated with two sets of inter-letter properties corresponding to (a) the space between the letter and the previous letter and (b) the space between the letter and the following letter.

At block 360, the processing logic determines a set of letter-combination properties for each of the letter-combinations. The letter-combination properties may be measures of the letter-combination as a whole. The letter-combination properties may include a length of the letter-combination. The letter-combination properties may include a maximum height. Specific letter-combination properties and methods of determining the letter-combination properties are described in further detail below with respect to FIG. 6.

The letter-combination properties may be stored in a letter-combination properties array of the letter-combination data object. Thus, each letter is associated with (1) a location, (2) letter shape properties of the letter, (3) one or two sets of inter-letter properties of the spaces adjacent to the letter, and (4) letter-combination properties of the letter-combination of which the letter is a part. As used herein, the term "letter properties" may refer to any and/or all of these four sets of information. Further, the first two sets of information (location and letter shape properties) may be referred to as "independent letter properties" of the letter as they as not based on other letters. In contrast, the second two sets of information (inter-letter properties and letter-combination properties) may be referred to as "dependent letter properties" of the letter as they are based, at least in part, on other letters.

Figure 4:
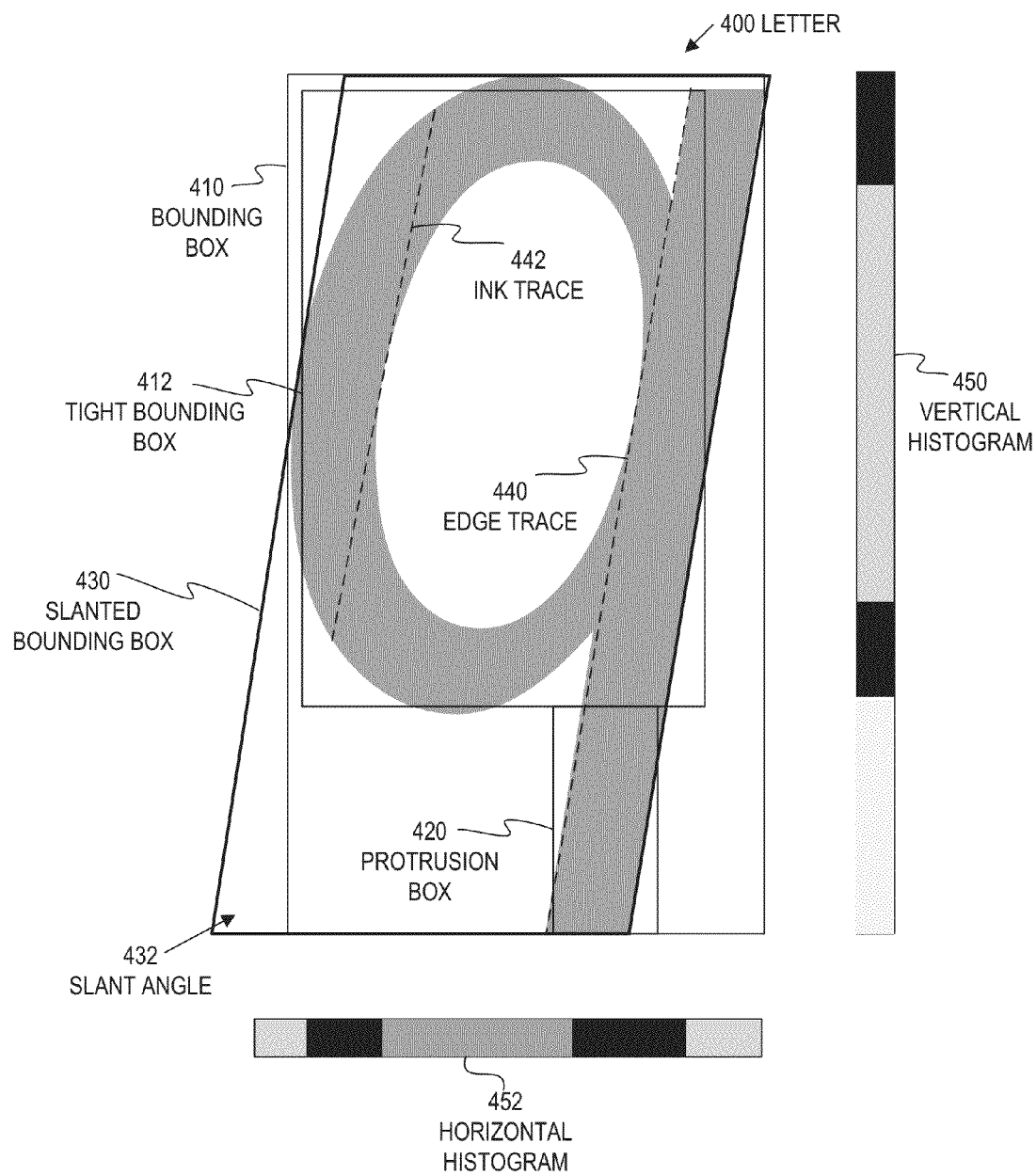
FIG. 4 is a diagram illustrating a letter and set of letter shape properties of the letter, according to one embodiment.

FIG. 4 is a diagram illustrating a letter 400 and set of letter shape properties of the letter 400 according to one embodiment. In FIG. 4, a letter 400 representing the character "q" is shown. More specifically, the letter 400 is an instance of the "LATIN SMALL LETTER Q" in Arial Narrow. Shown with respect to the letter 400 are a number of letter shape properties, a subclass of letter properties. It is to be appreciated that although certain letter shape properties are illustrated, they are examples only and other embodiments may include other letter shape properties.

One letter shape property that can be determined for the letter 400 is a bounding box 410 (or values representing a bounding box). The bounding box 410 may be a rectangular bounding box determined as the smallest rectangle that encompasses every pixel of the letter. Another letter shape property that can be determined for the letter 400 is a tight bounding box 412. The tight bounding box 412 may be determined as the smallest rectangle that encompasses at least a threshold percentage of the pixels of the letters 400. For example, the tight bounding box 412 may be the smallest rectangle that encompasses at least 75% of the pixels of the letter 400.

A series of bounding boxes may be determined for various thresholds corresponding to various tightnesses. Thus, an extremely tight bounding box may be determined as the smallest rectangle encompassing 50% of the pixels of the letter 400; a tight bounding box may be determined encompassing 75% of the pixels of the letter 400; a moderately tight bounding box may be determined encompassing 90% of the pixels of the letter 400; and an inclusive bounding box may be determined encompassing 100% of the pixels of the letter 400.

Another letter shape property that can be determined for the letter 400 is a set of protrusion boxes 420. The set may include zeros boxes (i.e., the null set). The set may include a single protrusion box 420 (as in the example of FIG. 4). The set may include two or more protrusion boxes. Each protrusion box 420 may be determined as box (e.g., the smallest box) encompassing a threshold amount of the pixels of the letter 400 not captured by the tight bounding box 412. The threshold amount may be a percentage of the un-captured pixels.

A descender is a portion of the letter that extends below the baseline of a font. Similarly, an ascender is a portion of the letter that extends above the x-height of the font. A protrusion box may generally encompass a descender of a letter (e.g., the protrusion box 420 of FIG. 2 generally encompasses the descender of the letter 400), an ascender of a letter, or any other portion of the letter.

Another letter shape property that can be determined for the letter 400 is a slanted bounding box 430. The slanted bounding box 430 may be determined as the smallest parallelogram that encompasses every pixel of the letter. The slanted bounding box 430 may define a slant angle 432. The slant angle 432 may be another letter shape property of the letter 400. For some letters, the slanted bounding box 430 may equal the bounding box 410. For some letters, the slant angle 432 may be zero.

The slanted bounding box 430 may be determined in other ways. For example, the slanted bounding box 430 may be determined as the smallest parallelogram that encompasses a certain percentage of pixels of the letter (e.g., 75% or 90%). The slanted bounding box 430 may be determined as a slanted trapezoid, triangle, or other shape. The slanted bounding box 430 may have a left edge that is slanted (e.g., not vertical), a right edge that is slanted, or both a left edge and a right are that are slanted. The slanted bounding box 430 may have a top edge and a bottom edge wherein the top edge extends horizontally beyond the bottom edge, wherein the bottom edge extends horizontally beyond the top edge, or both. The slanted bounding box 430 may have a top edge with a center point that is not above a center point of the bottom edge. The slanted bounding box 430 may have other properties.

Another letter shape property that can be determined for the letter 400 is a set of edge traces 440 (or a set of values representing the edge traces). The set may include zero edge traces (i.e., the null set). The set may include a single edge trace 440 (as in the example of FIG. 4). The set may include two or more edge traces. Each edge trace 440 may be determined as a line having a number of specific properties. First, each edge trace 440 may be at an angle within a threshold number of radians from the slant angle. Second, each edge trace 440 may be at least a threshold length. Third, each edge trace 440 may intersect (or be close to) an edge of the letter 400 along at least a threshold percentage of its length. Regarding the third property, as illustrated by the example edge trace 440, starting at the top of the letter 400, the edge trace coincides with the left edge of the stem of the letter. As the edge trace 440 moves downwards, it cuts across the rounded stroke where there is no edge, meets the edge of the stem again, cuts across the rounded stoke again, and follows the left edge of the stem through the descender.

Another letter shape property that can be determined for the letter 400 is a set of ink traces 442. The set may include zero ink traces (i.e., the null set). The set may include a single ink trace 442 (as in the example of FIG. 4). The set may include two or more ink traces. Each ink trace 442 may be determined as a line having a number of specific properties. First, each ink trace 442 may be at an angle within a threshold number of radians from the slant angle. Second, each ink trace 442 may be at least a threshold length. Third, each edge trace 440 may intersect (or be close to) the letter (not just an edge) along at least a threshold percentage of its length. In one embodiment, the threshold percentage is 100%.

Another letter shape property that can be determined for the letter 400 is a vertical histogram 450. The vertical histogram 450 includes a number of bins, each bin corresponding to a row of pixels or a contiguous set of rows of pixels. The value of each bin of the vertical histogram corresponds to the sum of the values of the pixels in the row(s) represented by the bin. Similarly, a horizontal histogram 452 can be determined as another letter shape property for the letter. The horizontal histogram 452 includes a number of bins corresponding to a column of pixels or a contiguous set of columns. The value at each bin in the horizontal histogram 452 corresponds to the sum of the values of the pixels in the column(s) represented by the bin.

Figure 5:
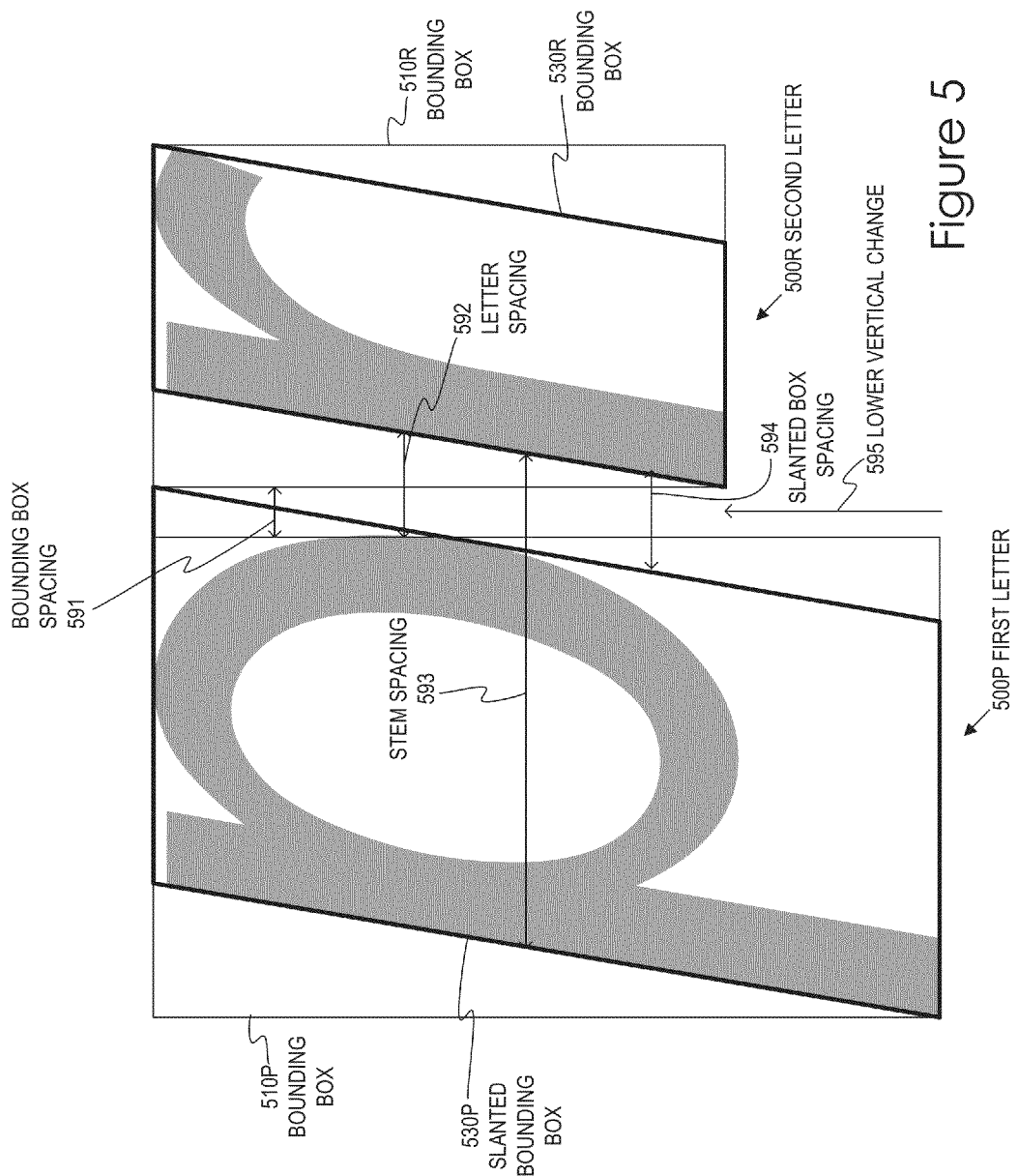
FIG. 5 is a diagram illustrating two letters and a set of inter-letter properties of the letters, according to one embodiment.

FIG. 5 is a diagram illustrating two letters 500P-500R and a set of inter-letter properties of the letters according to one embodiment. In FIG. 5, two letters 500P-500R representing the character pair "pr" are shown. Shown with respect to the letters 500P-500R are a number of inter-letter properties, a subclass of letter properties. It is to be appreciated that although certain inter-letter properties are illustrated, they are examples only and other embodiments may include other inter-letter properties.

One inter-letter property that can be determined for a pair of letters is a bounding box spacing 591. As noted above, a bounding box 510P-510R may be determined for each letter 500P-500R as the smallest rectangle that encompasses every pixel of the letter. The horizontal distance between the bounding boxes 510P-510R of two consecutive letters may be determined as the bounding box spacing 591.

Another inter-letter property that can be determined for a pair of letters is a letter spacing 592. The letter spacing 592 may be determined as the minimum horizontal distance between the two letters. In one embodiment, the horizontal spacing is determined for each row of pixels as the distance between the rightmost pixel (in the row) of the first letter and the leftmost pixel (in the row) of the second letter. The letter spacing 592 may be determined as the minimum of the horizontal spacing for each row. In one embodiment, the horizontal spacing for each row (or for a number of rows) is a separate inter-letter property.

Another inter-letter property that can be determined for a pair of letter is a stem spacing 593. The stem spacing 593 may be determined as the horizontal distance between the stems of the letters. The stem spacing 593 may be defined in terms of an edge trace or an ink trace of the letters. For example, the stem spacing 593 may be defined as the horizontal distance between the longest ink trace of each letter.

Another inter-letter property that can be determined for a pair of letters is a slanted box spacing 594. As noted above with respect to FIG. 4, a slanted bounding box 530P-530R may be determined for each letter 500P-500R as the smallest parallelogram that encompasses every pixel of the letter. The horizontal distance between the slanted bounding boxes 530P-530R of two consecutive letters may be determined as the slanted box spacing 594.

As noted above with respect to FIG. 4, a slanted bounding box 530P-530R defines a slant angle for each letter. Another inter-letter property that can be determined is a slant angle change. The slant angle change may be determined as the difference in slant angles between two consecutive letters.

Similarly, two other inter-letter properties that can be determined for a pair of letters are upper vertical change (zero and, thus, not shown in FIG. 5) and lower vertical change 595. The upper vertical change may be the difference between the top of the bounding boxes 510P-510R of the two letters. The lower vertical change 595 may be the difference between the bottoms of the bounding boxes 510P-510R of the two letters.

Figure 6:
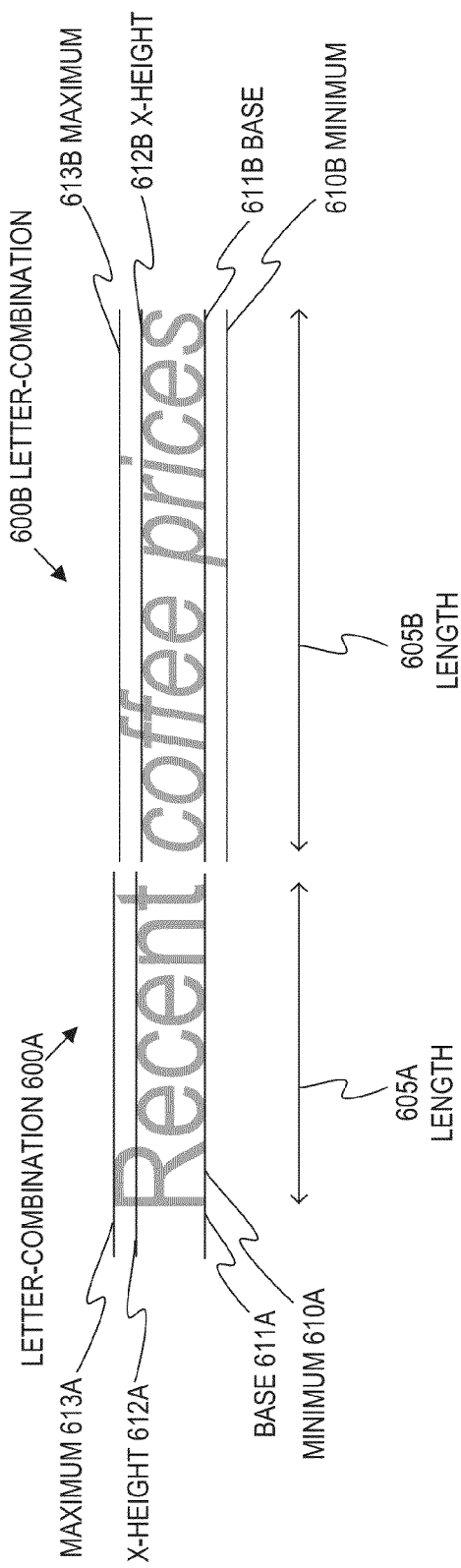
FIG. 6 is a diagram illustrating a letter-combination and a set of letter-combination properties, according to one embodiment.

FIG. 6 is a diagram illustrating a letter-combination 600 and a set of letter-combination properties according to one embodiment. In FIG. 6, a first letter-combination 600A representing the characters "Recent" is shown. A second letter-combination 600B representing the characters "coffee prices" is also shown. Shown with respect to the letter-combinations 600A-600B are a number of letter-combination properties, a subclass of letter properties. Thus, a letter-combination property of a letter-combination is similarly a letter-combination property of each of its constituent letters. It is to be appreciated that although certain letter-combination properties are illustrated, they are examples only and other embodiments may include other letter-combination properties.

One letter-combination property that can be determined for a letter-combination is the length 605A-605B of the letter-combination. The length 605A-605B may be determined as a number of letters or a number of pixels.

A set of letter-combination properties may be determined describing the vertical location of a set of horizontal lines defined by the letter-combination. A minimum 610A-610B may be defined as the vertical location of the lowest pixel of any of the letters of the letter-combination. Similarly, a maximum 613A-613B may be defined as the vertical location of the highest pixel of any of the letters of the letter-combination. A base 611A-611B may be defined generally describing the lowest point of most of the letters letter-combination. The base 611A-611B may be determined as a median or mode of the lowest points of the letters of the letter-combination. Similarly, an x-height 612A-612A may be determined as a median or mode of the highest points of the letters of the letter-combination.

In certain letter-combinations, the minimum, base, x-height, or maximum may be the same. For example, in the first letter-combination 600A, which does not include any letters with descenders, the base 611A and the minimum 610A are the same. In another letter-combination which does not include any capital letters or letters with ascenders, the x-height and maximum may be the same.

Sequential letter-combinations may have different values for various letter-combination properties. For example, in FIG. 6, the x-height 612A of the first letter-combination 600A is higher than the x-height 612B of the second letter-combination 600B. The differences between letter-combination properties may, themselves, be letter-combination properties. Thus, the second letter-combination 600B may have a letter-combination property indicating that the x-height 612B is lower than the x-height 612A of the previous letter-combination, the first letter-combination 600A.

Other letter-combination properties may be determined as statistics of the constituent letters. For example, a letter-combination property may be an average slant angle of the letters of the letter-combination. As another example, a letter-combination property may be an average width of the letters of the letter-combination.

Another letter-combination property that can be determined for the letter-combination is a vertical histogram. The vertical histogram includes a number of bins, each bin corresponding to a row of pixels or a contiguous set of rows of pixels. The value of each bin of the vertical histogram corresponds to the sum of the values of the pixels of all the letters in the row(s) represented by the bin. The vertical histogram may be determined as a sum or average of the vertical histograms of the constituent letters.

Figure 7:
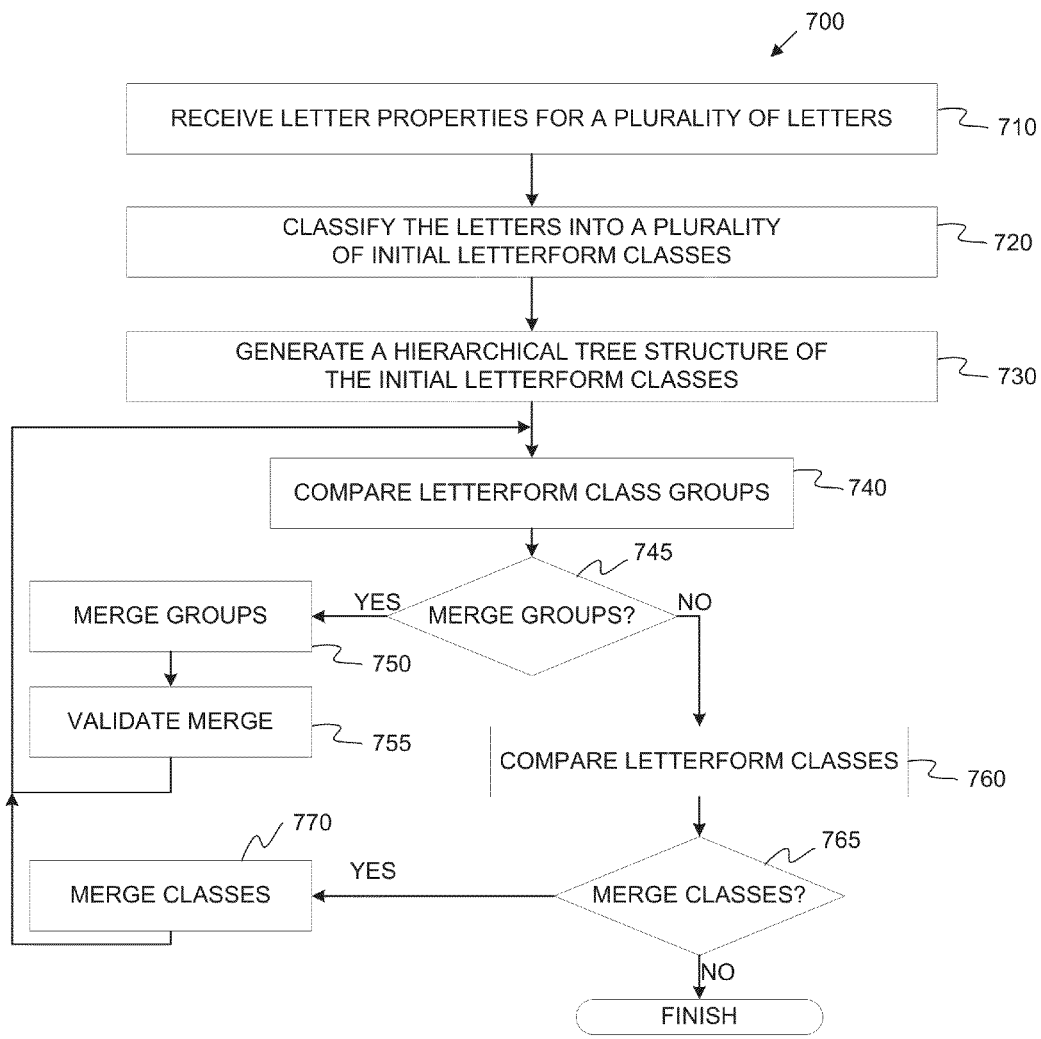
FIG. 7 is a flowchart illustrating an embodiment of a method of classifying letters based on letter properties.

FIG. 7 is a flowchart illustrating an embodiment of a method 700 of classifying letters based on letter properties. The method 700 may be performed by processing logic that may include hardware (e.g., circuitry, dedicated logic, programmable logic, microcode, etc.), software (e.g., instructions executed by a processing device), firmware or a combination thereof. For example, the method 700 may be performed by the processing device 1302 of FIG. 13, described below.

At block 710, the processing logic receives letter properties for a plurality of letters received. The letter properties may be received after being generated as described above with respect to FIG. 3. The letter properties may be received as a set of letter data objects and letter-combination data objects. The letter properties may include (1) a location of the letter in an image, (2) letter shape properties of the letter as described in detail above with respect to FIG. 4, (3) one or two sets of inter-letter properties of the spaces adjacent to the letter as described in detail above with respect to FIG. 5, and (4) letter-combination properties of the letter-combination of which the letter is a part as described above with respect to FIG. 6.

At block 720, the processing logic classifies the letters into a plurality of initial letterform classes according to the letter properties of the letters. The processing logic may classify the letters according to any object classification technique. The letters are classified such that the initial letterform classes illuminate a relationship between the letters classified into the same class, e.g., a shared letter property.

In one embodiment, the classification is language agnostic. Thus, the classification is done without a priori letterform classes. Rather, the processing logic generates the initial letterform classes as it classifies the letters into the initial letterform classes. The initial letterform classes may be generated to generally correspond to letterforms of letters in the text. However, the initial letterform classes may not be exact or complete.

Figure 8:
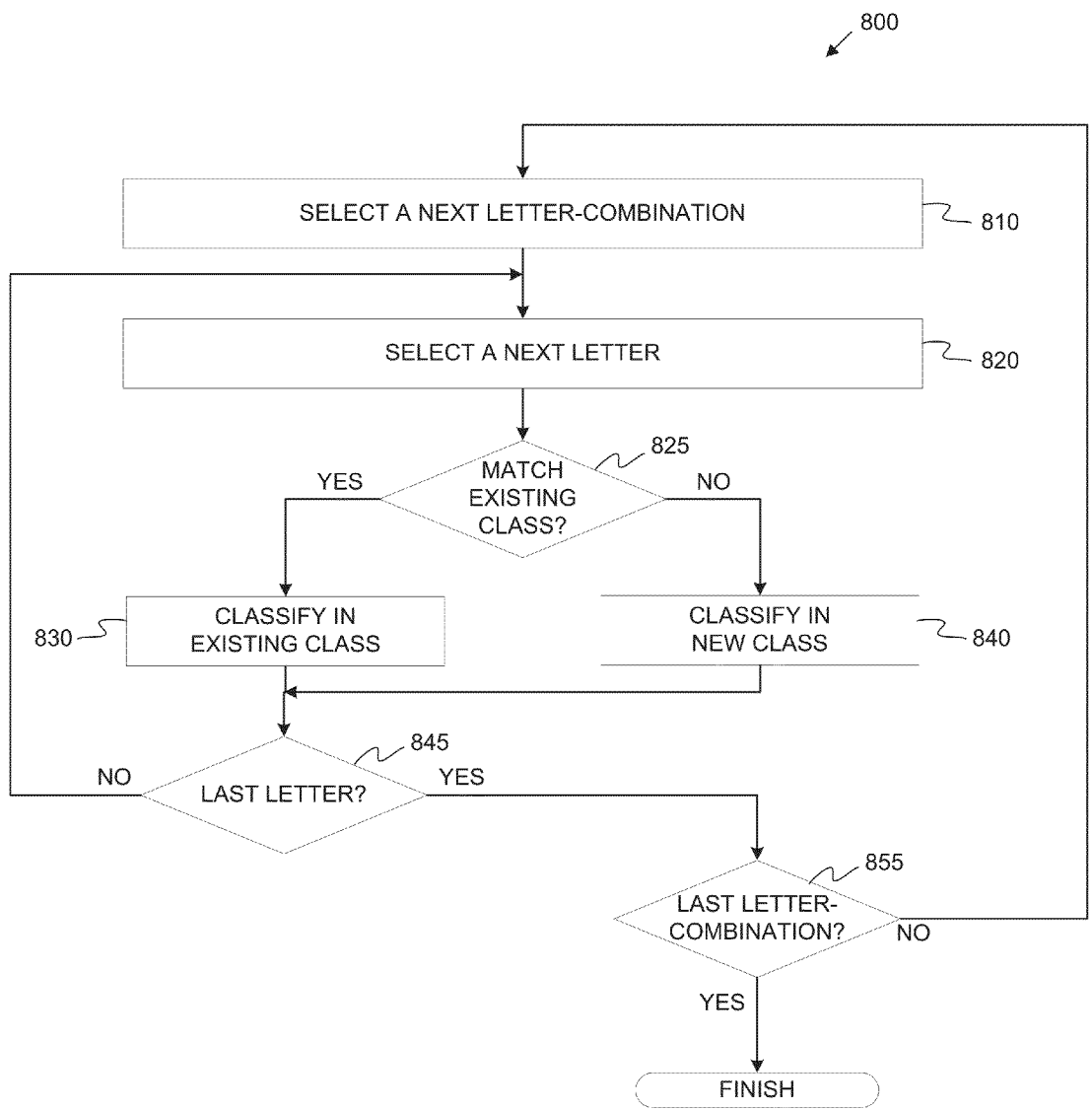
FIG. 8 is a flowchart illustrating an embodiment of a method of classifying letters into a plurality of initial letterform classes.

The processing logic may classify the letters into a plurality of initial letterform classes using the method 800 of FIG. 8. FIG. 8 is a flowchart illustrating an embodiment of a method 800 of classifying letters into a plurality of initial letterform classes. At block 810, a next letter-combination is selected from the set of letter-combinations that have not yet been selected. The next letter-combination may be selected randomly. The next letter-combination may be selected in an order based on the location of the letter-combination (or its constituent letters).

At block 820, a next letter of the selected letter-combination is selected from the set of letters that have not yet been selected. The next letter may be selected randomly. The next letter may be selected in an order corresponding to the order of the letter-combination.

At block 825, it is determined whether the letter matches an existing initial letterform class. The determination may be made by comparing the letter properties of the letter with the representative letter properties of each existing initial letterform class until a match is found or the letter has been compared to each of the existing initial letterform classes. If it is determined that the letter matches an existing class, the method 800 moves to block 830 and the letter is classified into the existing class.

In one embodiment, the existing class (or the representative letter properties of the class) may be modified based on the addition of the letter to the class. The representative letter properties may be the average (e.g., a mean, median, or mode) of the letter properties of the letters classified into the class. The representative letter properties may be determined based on other statistics of the letter properties of the letters classified into the class.

If it is determined, at block 825, that the letter does not match an existing class, the method 800 moves to class 840 where a new class is generated and the letter is classified into the new class. The new class may be generated with a set of representative letter properties. As noted above, the representative letter properties may be an average or otherwise based on the letter properties of the letters classified into the class.

At block 845, it is determined whether the selected letter was the last letter in the letter-combination or if there are additional not-yet-selected letters. If there are additional letters in the letter-combination to be classified, the method 800 returns to block 820. If the letter was the last letter, the method 800 moves to block 855 where it is determined whether the selected letter-combination was the last letter-combination. If so, the method 800 ends. If not, the method returns to block 810 and repeats.

An example progress of the method 800 of FIG. 8 is now described with respect to the word "coffee". At block 810, a letter-combination is selected containing the word "coffee". At block 820, a next (first) letter is selected, the letter "c". At block 825, it is determined that the letter does not belong to an existing class, because there are no classes. Thus, at block 840, the letter "c" is classified into a new initial letterform class (called "initial-c").

It is to be appreciated that although letterform classes (and groups) are given descriptive names herein for the simplicity of explanation, the letterform classes need not be given descriptive names. Further, it is to be appreciated that the letterform classes (and groups) descried herein are examples and other implementations may or may not include similar classes (or groups).

Through block 845, the method returns to block 820 where the next letter "o" is selected. At block 825, it is determined that the letter does not belong to an existing class by comparing the letter properties of the "o" with the letter properties of the "initial-c" class and determining that they are not similar enough to classify the letter "o" in the "initial-c" class. Thus, at block 840, the letter "o" is classified into a new initial letterform class (called "crowded-o").

Through block 845, the method returns to block 820 where the next letter "f" (the first "f") is selected. At block 825, it is determined that the letter does not belong to an existing class by comparing the letter properties of the "f" with the letter properties of the "initial-c" class and the "crowded-o" class and determining that they are not similar enough to classify the letter "f" in either of the existing classes. Thus, at block 840, the letter "f" is classified into a new initial letterform class (called "overhanging-f").

Through block 845, the method returns to block 820 where the next letter "f" (the second "f") is selected. At block 825, it is determined that the letter matches the existing class "overhanging-f". Thus, at block 830, the letter "f" is classified into the existing initial letter form class "overhanging-f".

Through block 845, the method returns to block 820 where the next letter "e" (the first "e") is selected. At block 825, it is determined that the letter does not match any of the existing classes and, at block 840, the letter "e" is classified into a new initial letterform class (called "normal-e").

Through block 845, the method returns to block 820 where the next letter "e" (the second "e") is selected. At block 825, it is determined that the letter does not match any of the existing classes. Although it may be desirable that the second "e" be classified into the same initial letterform class as the first "e", that may not always be the case. As described further below, the initial letterform classes are modified to improve the final classification. But, in this example, because the letter properties include not only the letter shape properties, but also inter-letter properties, the second "e" is determined not to match the existing initial letterform class "normal-e" in block 825. Thus, at block 840, the letter "e" is classified into a new initial letterform class (called "terminal-e"). At described further below, later processing may merge initial letterform classes such that "normal-e" and "terminal-e" may be merged to form a final letterform class representing the character "e" in general.

Returning to FIG. 7, as described above, at block 720, the processing logic classifies the letters into a plurality of initial letterform classes. As described with respect to FIG. 8, each of the initial letterform classes is associated with representative letter properties based on the letter properties of the letters classified into the class.

The processing logic may generate, for each initial letterform class, an initial letterform class data object that includes a set of representative letter properties and a list of references to letter data objects corresponding to letters classified into letterform class.

At block 730, the letterform classes are arranged in a hierarchical tree structure based on their representative letter properties. Although embodiments are described below with respect to hierarchical tree structure, it is to be appreciated that other data structures may be used. The initial letterform classes are arranged such that similar initial letterform classes are closely coupled in the tree structure. Thus, initial letterform classes with many representative letter properties in common and few that differ may be assigned as child nodes of the same parent.

Figure 9:
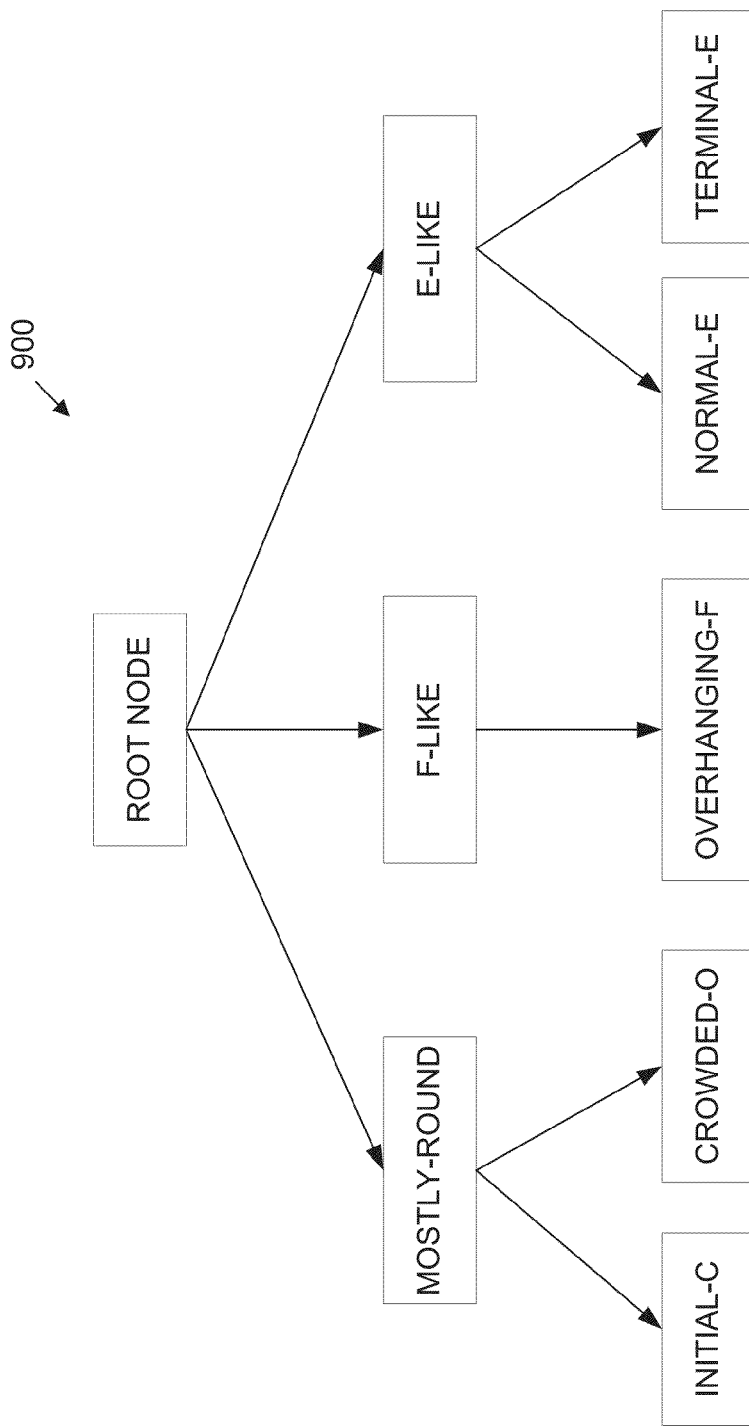
FIG. 9 is a sample hierarchical tree structure, according to one embodiment.

Following the example of FIG. 8, FIG. 9 is a sample hierarchical tree structure according to one embodiment. The hierarchical tree structure 900 of FIG. 9 includes three levels. It is to be appreciated that other tree structures may include more or fewer levels. The first level includes a single root node. The third level includes a set of terminal nodes, each of the terminal nodes corresponding to one of the initial letterform classes. Although five terminal nodes are illustrated in FIG. 9 for simplicity, it is to be appreciated that other tree structures may include more or fewer terminal nodes corresponding to more or fewer initial letterform classes.

Each of the terminal nodes is associated with a parent node and each parent node is associated with one or more terminal node. Each parent node represents a grouping of initial letterform classes, e.g. a letterform class group. The letterform class group represents a set of group letter properties that the letterform classes of the group share. Thus, the initial letterform groups "initial-c" and "crowded-o" are part of the same letterform class group (called "mostly-round") because they share similar representative letter properties, e.g., both shapes are generally circular. Similarly, the initial letterform groups "normal-e" and "terminal-e" are part of the same letterform class group (called "e-like"). Likewise, "initial-c" and "overhanging-f" are not part of the same letterform class group because they do not share many similar letter properties.

In one embodiment, initial letterform class groups are themselves grouped into super-groups. They may be represented by grandparent nodes in a level in the hierarchical structure between the parent nodes and the root node. Similarly, initial letterform class groups may include sub-groups, each of the sub-groups containing one or more terminal nodes. The sub-groups may be represented by intermediate nodes in the hierarchical structure between the terminal nodes and the parent nodes.

Returning to FIG. 7, as described above, at block 730, the processing logic generates a hierarchical tree structure of the initial letterform classes such that each of the terminal nodes of the hierarchical tree structures represents one of the initial letterform classes. As noted above, the hierarchical tree structure is generated based on the representative letter properties of the initial letterform classes.

Blocks 740-770 describe an iterative process in which the hierarchical tree structure (or the elements that the structure represents) is modified to generate a set of final letterform classes. Each of the final letterform classes correspond to one of the letterforms of the letters of the text. Thus, if a simple alphabet of 26 characters ("a", "b", "c", etc.) were used to create text, the final letterform classes would comprise 26 classes corresponding to the 26 characters. It is to be appreciated, however, that slight variations may occur due to imperfect scans of the text.

At block 740, the processing logic compares the letterform class groups to each other. The letterform class groups are compared to each other by comparing their corresponding group letter properties. The comparison results in a measure of similarity of letterform class groups. Thus, the comparison results in a similarity metric associated with a pair of the letterform class groups. Each letterform class group is compared to each of the others, resulting in N×(N−1)/2 comparisons if there are N letterform class groups.

In reference to the hierarchical tree structure of FIG. 9, the letterform class groups are represented by parent nodes. Thus, the "mostly-round" letterform class group is compared to the "f-like" letterform class group, resulting in a similarity metric which is low, indicating that the "mostly-round" group and "f-like" group are dissimilar. Next, the "mostly-round" group is compared to the "e-like" group, resulting in similarly metric which is moderately high, indicating that the "mostly-round" group and the "e-like" group are similar (as may be expected because the characters "c", "o", and "e" share many similarly features). Next, the "f-like" group is compared to the "e-like" group, resulting in a similarity metric which is low.

At block 745, the processing logic determines, based on the comparison of block 740, whether to merge two of the letterform class groups into a single letterform class group. The processing logic may choose to merge two of the groups if the similarity metric for the pair of groups is above a specific threshold. If it is determined to merge the groups, the method 700 continues to block 750 where the processing logic merges the groups. Two (or more) letterform class groups are merged by creating a single letterform class group containing the letterform classes of the groups. The single letterform class group may be one of the starting groups or a new group.

Figure 10:
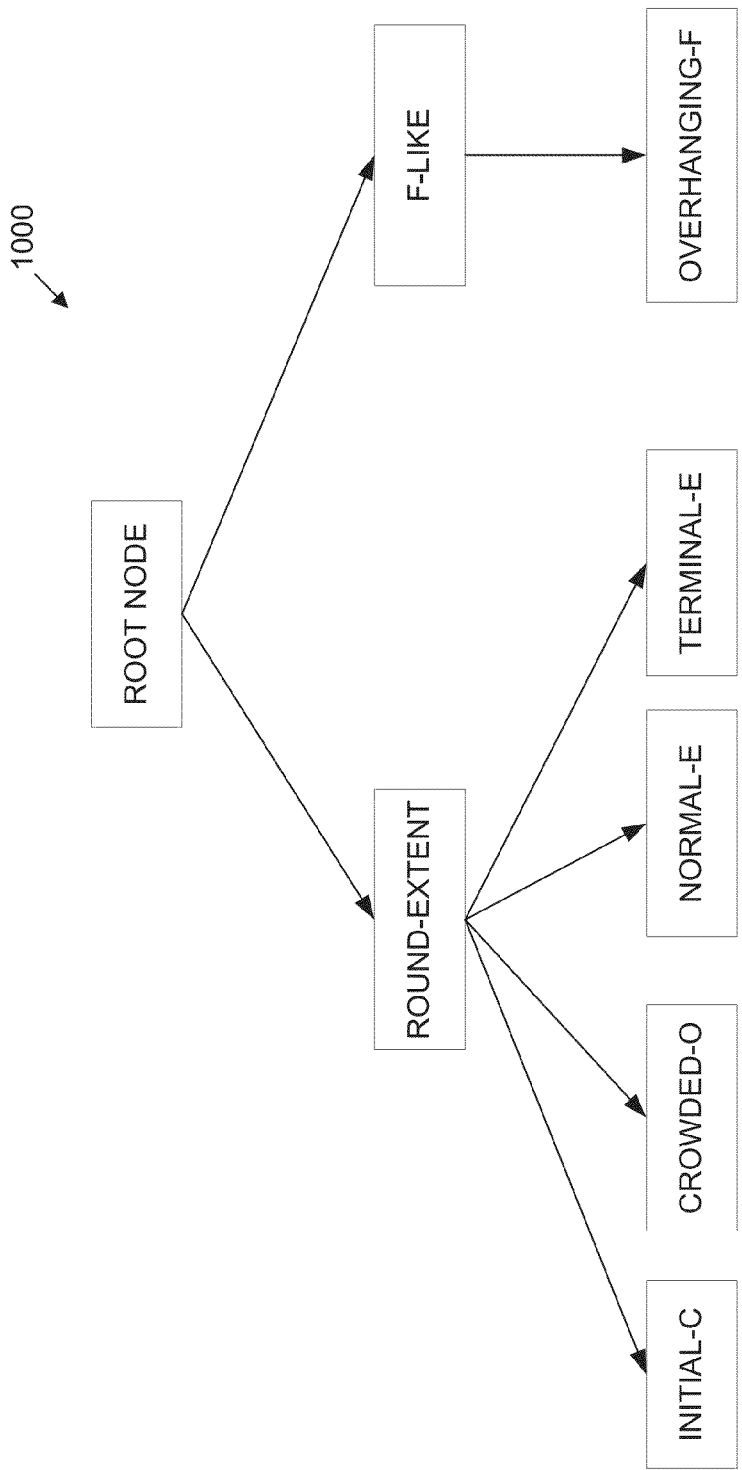
FIG. 10 is a sample hierarchical tree structure after one iteration, according to one embodiment.

In reference to the hierarchical tree structure of FIG. 9, because the "mostly-round" group and the "e-like" group are similar, for an example, it would be decided to merge the two groups (into a new group called "round-extent"). Thus, the hierarchical tree structure would, after the merging, appear as shown in FIG. 10, with two parent nodes, one representing the "f-like" group with a single associated terminal node ("overhanging-f") and another representing the "round-extent" group with four associated terminal nodes ("initial-c", "crowded-o", "normal-e", and "terminal-e"). FIG. 10 is a sample hierarchical tree structure 1000 after one iteration according to one embodiment.

From block 750, the method 700 continues to block 755 where the merge is validated. When two groups are merged, the resulting merged group may have slightly different group letter properties than either of the starting groups. In particular, as mentioned above, a letterform class group represents a set of group letter properties that the letterform classes of the group share. Because the merged group includes a different set of letterform classes than the starting groups, the merged group may have different group letter properties than the starting groups. The merge may be validated by determining whether, in view of the new group letter properties of the merged group, the merged group is to be split-off from other groups within its super-group or whether the merged group is to be split back into two groups. This determination can be performed on the basis of comparing the merged group with other groups in its super-group and comparing the letterform classes of the merged group with each other. If a similarly metric generated by the comparison is below a threshold, it may be decided to split-off the merged group from other groups in its super-group, creating a new super-group for the merged group. Likewise, if a similarly metric generated by the comparison is below a threshold, it may be decided to split the merged group into two groups.

From block 755, the method returns to block 740 for another iteration, starting with comparing letterform class groups. In reference to the hierarchical tree structure 1000 of FIG. 10, the "mostly-round" merged letterform class group is compared to the "f-like" letterform class group, resulting in a similarity metric which is low. Thus, at block 745 it is decided not to merge the groups. If it is decided not to merge the groups, the method 700 moves to block 760 where letterform classes are compared.

At block 760, the processing logic compares the letterform classes to each other. The comparison of the letterform classes proceeds in a similar manner to comparison of the letterform class groups. Indeed, iteration through blocks 740-765 may include (in some embodiments) additional comparisons at other levels of the hierarchy (e.g., super-group nodes, sub-group nodes, intermediate nodes, etc.). For example, the letterform classes may be compared to each other by comparing their corresponding representative letter properties. The comparison results in a measure of similarity of letterform classes. Thus, the comparison results in a similarity metric associated with a pair of the letterform classes. In one embodiment, each letterform class is compared to each of the others (regardless of grouping), resulting in M×(M−1)/2 comparisons if there are M letterform classes. In another embodiment, letterform classes are only compared to those within the same group.

In reference to the hierarchical tree structure 1000 of FIG. 10, the letterform classes are represented by terminal nodes. Thus, the "initial-c" letterform class is compared to (1) the "crowded-o" letterform class, resulting in a similarity metric which is moderate, (2) the "normal-e" letterform class, resulting in a similarity metric which is moderate, (3) the "terminal-e" letterform class, resulting in a similarity metric which is moderate, and (4) the "overhanging-f" letterform class, resulting in a similarity metric which is low. Likewise, the "crowded-o" letterform class is compared to the other classes. When the "normal-e" and "terminal-e" letterform classes are compared, the result is a similarity metric which is high, e.g., above a threshold. Thus, at block 765, it is decided to merge the two letterform classes. Upon such decision, the method 700 moves to block 770 where the processing logic merges the letterform classes.

Two (or more) letterform classes are merged by creating a single letterform class containing the letters of the letterform classes. The single letterform class group may be one of the starting groups or a new group.

Figure 11:
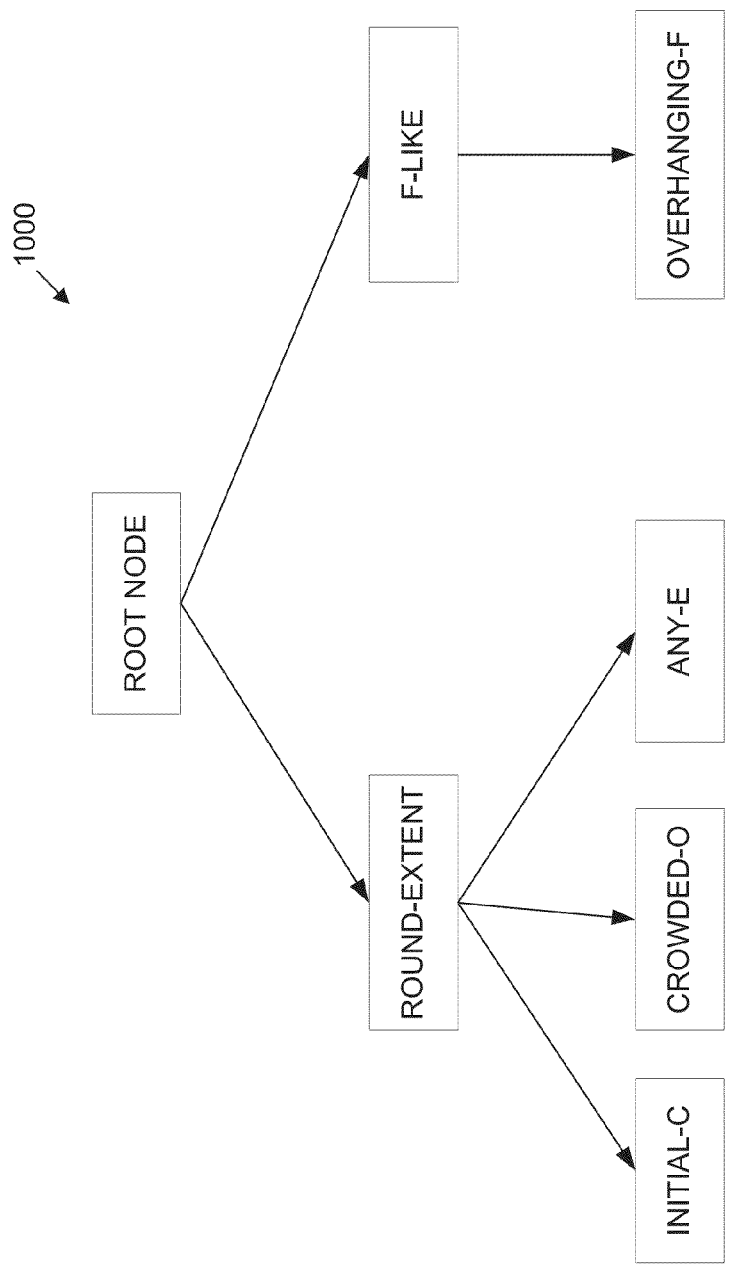
FIG. 11 is a sample hierarchical structure after two iterations, according to one embodiment.

In merging "normal-e" with "terminal-e" to create a new letterform class (called "any-e"), the letters in the image in the "normal-e" class (e.g., the first "e" in "coffee") and the letters in the image associated in the "terminal-e" class (e.g., the second "e" in "coffee") are all placed into the single merged class. Thus, the hierarchical tree structure would, after the merging, appear as shown in FIG. 11, with two parent nodes, one representing the "f-like" group with a single associated terminal node ("overhanging-f") and another representing the "round-extent" group with three associated terminal nodes ("initial-c", "crowded-o", "any-e"). FIG. 11 is a sample hierarchical tree structure 1100 after two iterations according to one embodiment.

As with the letterform class groups, merged letterform classes may, in some embodiments be validated to determine if the newly merged letterform class should be split-off from other classes in the group. Further, the merged letterform class may validated to determine if the newly merged letterform class should be split into two separate letterform classes by generating similarity metrics between pairs of letters of the merged letterform class.

After merging the letterform classes in block 770, the method 700 returns to block 740 for another iteration. If, at block 745 and block 765, it is determined not to merge any groups or classes, the method 700 ends and each of the letterform classes represented by the terminal nodes are deemed final letterform classes. Each of the final letterform classes includes one or more letters of the image that have the same letterform (e.g., letters of the image that are of the same character). Each of the final letterform classes is associated with a set of representative letter properties that are substantially similar to the important letter properties of each of the letters in the class. Conversely, each of the letters in the letterform class has similar letter properties that are well represented by the representative letter properties of the letterform class.

A representative letter may be formed for each of the letterform classes based on the letter properties or, more simply, as an average of the letters of the letterform class. The representative letter may be run through a traditional character recognition system to determine the character of the letterform class (e.g., whether the letterform class corresponds to the letter "e" or the letter "q"). It can be inferred that each letter in the letterform class represents the same character and, thus, the character that every letter represents can be determined. Using this information, a text file (or another type of reflowable content file) can be generated for rendering on an electronic book reader or other electronic device.

Figure 12:
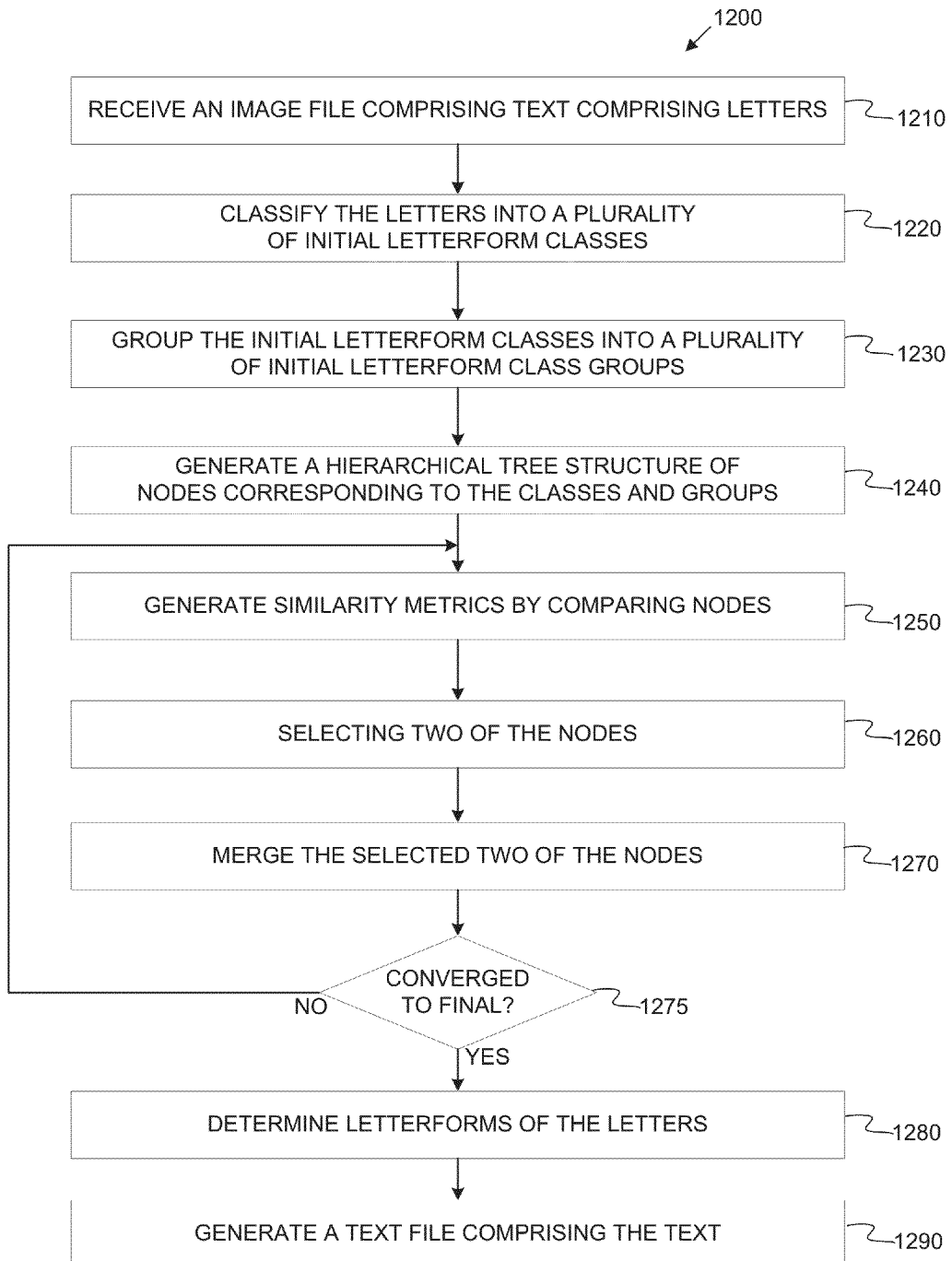
FIG. 12 is a flowchart illustrating an embodiment of a method of generating a text file.

FIG. 12 is a flowchart illustrating an embodiment of a method 1200 of generating a text file. The method 1200 may be performed by processing logic that may include hardware (e.g., circuitry, dedicated logic, programmable logic, microcode, etc.), software (e.g., instructions executed by a processing device), firmware or a combination thereof. For example, the method 1200 may be performed by the processing device 1302 of FIG. 13, described below.

At block 1210, the processing logic receives an image file comprising text. The processing logic may receive an image file as described above with respect to block 310 of FIG. 3. The text may comprise normal text, italic text, script text, and/or other types of text. The text may comprise a plurality of letters. Each of the letters may be an unknown one of a set of letterforms, but associated with a known set of letter properties. For example, it may not be known what character each letter represents, but a set of letter properties (e.g., letter shape properties or inter-letter properties) may be known or determined based on the letter. As described below, the processing logic may use the known letter properties to determine the unknown one of the set of letterforms for each letter. In one embodiment, the set of letterforms are, themselves, unknown. Thus, the classification (described below in block 1220) is language-agnostic.

At block 1220, the processing logic classifies the letters into a plurality of initial letterform classes. The processing logic may classify the letters as described above with respect to block 720 of FIG. 7. The processing logic may classify the letters based on their respective letter properties. For example, the initial letterform classes may each represent common letter properties of the plurality of letters in the initial letterform class. Classifying the letters into the plurality of initial letter form classes may include generating the initial letterform classes as described in block 840 of FIG. 8.

At block 1230, the processing logic groups the initial letterform classes into a plurality of initial letterform class groups (which may also be referred to as "letterform groups", "class groups" or, simply, "groups"). As described above with respect to FIG. 8, each of the initial letterform classes may be associated with representative letter properties based on the letter properties of the letters classified into the class. The processing logic may group the initial letterform classes based on the representative letter properties. For example, each initial letterform class group may represent a set of group letter properties that the letterform classes of the group share. In one embodiment, initial letterform class groups are themselves, grouped into super-groups. In one embodiment, initial letterform class groups may include sub-groups, each of the sub-groups containing one or more classes.

At block 1240, the processing logic generates a hierarchical tree structure. The processing logic may generate the hierarchical tree structure as described above with respect to block 730 of FIG. 7. The hierarchical tree structure may include a set of nodes, the set of nodes including a plurality of parent nodes each of which is associated with one or more terminal nodes. Each terminal node may represent an initial letterform class and each parent node may represent an initial letterform class group. An example of a hierarchical tree structure is described above with respect to FIG. 9.

Blocks 1250-1275 describe an iterative process in which the hierarchical tree structure is modified to determine a set of final letterform classes where each of the final letterform classes represents one of the set of letterforms of the plurality of letters. Each of the final letterform classes includes one or more of the plurality of letters. Thus, the processing logic can use this information (as described below) to determine the unknown letterform of each of the letters, turning it into a known letterform.

At block 1250, the processing logic generates similarity metrics by comparing nodes of the hierarchical structure. The processing logic may generate the similarity metrics as described above with respect to blocks 740 and 760 of FIG. 7. For example, the processing logic may generate the similarity metrics by comparing representative letter properties of the initial letterform classes represented by terminal nodes. This may generate a plurality of terminal similarity metrics. As another example, the processing logic may generate the similarity metrics by comparing group properties of the initial letterform class groups represented by parent nodes. This may generate a plurality of parent similarity metrics.

At block 1260, the processing logic selects two of the nodes based on the plurality of similarity metrics. The processing logic may select the two of the nodes as described above with respect to blocks 745 and 765 of FIG. 7. For example, the processing logic may select the two of the nodes associated with the highest similarity metric.

At block 1270, the processing logic merges the selected nodes. The processing logic may merge the selected nodes as described above with respect to blocks 750 and 770 of FIG. 7. For example, the processing logic may generate a merged node by merging a first node and a second node. The merged node may be a parent node that represents a letterform class group including all the letterform classes of the groups represented by the first node and the second node. The merged node may be a terminal node that represents a letterform class that includes all the letters of the classes represented by the first node and the second node.

Thus, with respect to blocks 1250-1270, in one embodiment, when one of the similarity metrics is above a threshold, the processing logic generates a merged node by merging two nodes associated with the similarity metric, e.g., by replacing the two nodes associated with the similarity metric with a single node. The two nodes may be two parent node, two terminal nodes, or any two nodes associated with a similarity metric.

As described above with respect to blocks 750, 755, and 770 of FIG. 7, merging the two nodes may include validating the merge. When two nodes are merged, the merged node may have different letter properties than either of the starting nodes that may be determined by the processing logic as part of the merging. Similarly, the processing logic may determine updated letter properties for any ancestral nodes, nodes higher in the hierarchical structure that include the merged node. The merge may be validated by determining whether, in view of the updated letter properties of the merged node (or its ancestral nodes), the merged node is to be split-off from other nodes within its grouping (e.g., group, super-group, etc.) or whether the merged node is to be split back into two nodes within its grouping. This determination can be performed on the basis of comparing the merged node with other nodes in its grouping. If a similarly metric generated by the comparison is below a threshold, it may be decided to split-off the merged node from other nodes in its grouping, creating a new grouping for the merged node. This determination can be performed on the basis of comparing the children of the merged node with each other. If a similarly metric generated by the comparison is below a threshold, it may be decided to split the merged node into two nodes.

At block 1275, the processing logic determines if the iterative process has converged. The processing logic, thus, determines whether the letterform classes of the hierarchical tree structure are the final letterform classes. The processing logic may determine that the iterative process has converged if all the similarity metrics are below a threshold. If it is determined that the process has not converged, the method 1200 returns to block 1250 for another iteration. In block 1250, the processing logic generates similarity metrics by comparing nodes. It is to be appreciated that the processing logic need not regenerate similarity metrics for pairs of nodes that did not change in the previous iteration (e.g., nodes that do not have updated letter properties). If it is determined that the process has converged, the method 1200 continues to block 1280.

Thus, with respect to block 1275, in one embodiment, when none of the similarity metrics are above a threshold, the final letterform classes are determined based on the terminal nodes of the hierarchical tree structure.

At block 1280, the processing logic determines the letterforms of the letters. As noted above, each of the final letterform classes represents a letterform (in the form of a set of representative letter properties). The set of representative letter properties (or a representative letter shape) can be processed using OCR to determine a corresponding character or letterform. As also noted above, each of the final letterform classes includes one or more of the plurality of letters. The processing logic associates with each of the plurality of letters the letterform represented by the final letterform class to which the letter belongs. Thus, each letter is associated with a letterform. Whereas the method 1200 started with an unknown letterform for each letter (but known or determinable letter properties), at block 1280, the method 1200 produces a known letterform for each letter.

At block 1290, the known letterform for each letter may be used to generate a text file representing the text of the image. The text file may include a series of character codes that reference characters or a series of shape codes that reference representative shapes. For example, the example, the text file may be a series of ASCII (American Standard Code for Information Interchange) codes or Unicode code points. The text file may be searchable. The text file may be rendered on an electronic device, such as an electronic book reader. The text file may be significantly smaller than the image file in a storage device.

Figure 13:
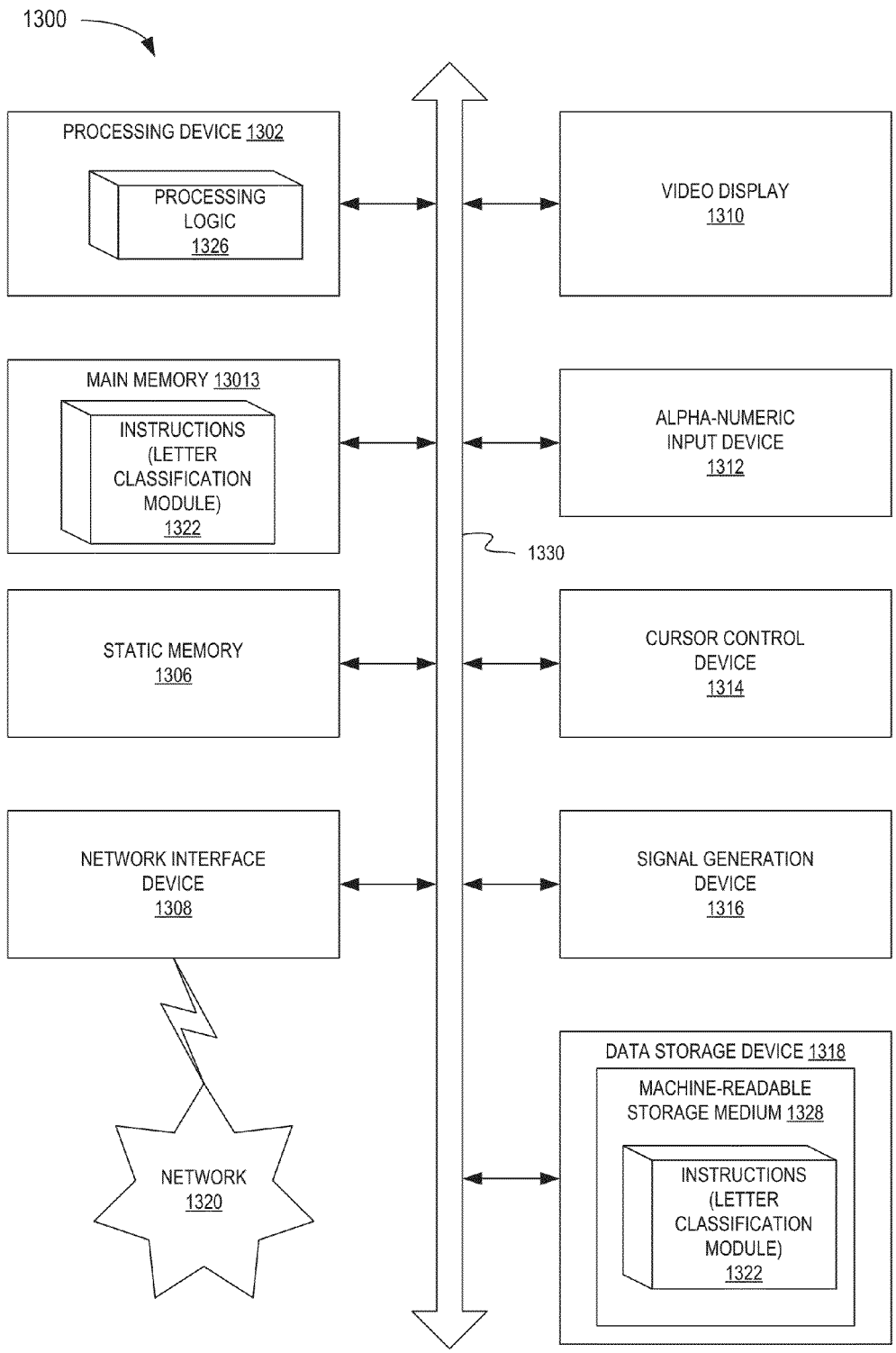
FIG. 13 illustrates a functional block diagram of an exemplary electronic device, in accordance with one embodiment.

FIG. 13 illustrates a diagrammatic representation of a machine in the exemplary form of a computer system 1300 within which a set of instructions, for causing the machine to perform any one or more of the methodologies discussed herein, may be executed. The computer system 1300 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server machine in client-server network environment. The machine may be a personal computer (PC), a set-top box (STB), a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device (processor) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)) and a data storage device 1318, which communicate with each other via a bus 1330.

The processing device 1302 represents one or more general-purpose processing devices such as a microprocessor, central processing unit or the like. More particularly, the processing device 1302 may be a complex instruction set computing (CISC) microprocessor, reduced instruction set computing (RISC) microprocessor, very long instruction word (VLIW) microprocessor or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor or the like. The processing device 1302 is configured to execute the processing logic 1326 for performing the operations and steps discussed herein. For example, the processing logic 1326 may include a letter classification module that performs the methodologies of FIG. 3, FIG. 7, and/or FIG. 12.

The computer system 1300 may further include a network interface device 1308. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and a signal generation device 1316 (e.g., a speaker).

The data storage device 1318 may include a computer-readable medium 1328 on which is stored one or more sets of instructions 1322 (e.g., instructions to perform the method 300 of FIG. 3, the method 700 of FIG. 7, or the method 1200 of FIG. 12) embodying any one or more of the methodologies or functions described herein. The instructions 1322 may also reside, completely or at least partially, within the main memory 1304 and/or within processing logic 1326 of the processing device 1302 during execution thereof by the computer system 1300, the main memory 1304 and the processing device 1302 also constituting computer-readable media. The instructions 1322 may further be transmitted or received over a network 1320 via the network interface device 1308.

While the computer-readable storage medium 1328 is shown in an exemplary embodiment to be a single medium, the term "computer-readable storage medium" or "computer-readable medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving an image file representing an image comprising text, the text comprising gridless text comprising a plurality of letters;
   performing optical character recognition (OCR) on the image file to generate a text file comprising a series of character codes representing the text, wherein performing OCR comprises:
      determining, for a first letter of the plurality of letters, a set of letter properties, wherein the set of letter properties includes letter shape properties that are independent of other letters of the plurality of letters, inter-letter properties that are dependent on an adjacent letter of the first letter, and letter-combination properties that are dependent on letters in a same word or line as the first letter;
      classifying the first letter into a first letterform class of a plurality of letterform classes based on the set of letter properties;
      determining a character code for the first letterform class; and
      generating the text file based on the character code.

2. The method of claim 1, wherein performing OCR further comprises generating the plurality of letterform classes, wherein generating the first letterform class is based on the set of letter properties.

3. The method of claim 1, wherein the letter shape properties comprise a rectangular bounding box determined as the smallest rectangle that encompasses every pixel of the first letter and a slanted bounding box determined as the smallest parallelogram that encompasses every pixel of the letter.

4. The method of claim 1, wherein performing OCR comprises detecting a plurality of ink closures without using a grid, wherein each ink closure is a portion of the image having a set of contiguous pixels with a brightness value below an ink-presence threshold that are surrounded by a pixels with brightness value above a ink-absence threshold.

5. A method comprising:
receiving an image file representing an image comprising text;
determining, by a processing device, a plurality of portions of the image respectively corresponding to a plurality of letters of the text;
determining, for a first letter of the plurality of letters, a set of letter properties comprising at least one dependent letter property and at least one independent letter property, wherein each of the at least one dependent letter property of the first letter is dependent on another letter of the plurality of letters and each of the at least one independent letter property of the first letter is independent of all other letters of the plurality of letters; and
classifying the first letter into one of a plurality of letterform classes based on the set of letter properties.

6. The method of claim 5, wherein the at least one independent letter property comprises a rectangular bounding box and a slanted bounding box.

7. The method of claim 5, wherein the at least one independent letter property comprises a protrusion box.

8. The method of claim 5, wherein the at least one independent letter property comprises at least one of a vertical histogram or a horizontal histogram.

9. The method of claim 5, wherein the at least one independent letter property comprises at least one of an edge trace or an ink trace.

10. The method of claim 5, wherein the at least one dependent letter property comprises at least one of an inter-letter property based, at least in part, on an adjacent letter or a letter-combination property based on a letter-combination of which the letter is a part.

11. The method of claim 5, further comprising:
determining a portion of the image corresponding to a non-textual element;
determining shape properties for the non-textual element; and
determining that the non-textual element is not a letter based on the shape properties.

12. The method of claim 5, wherein classifying the first letter into the one of the plurality of letterform classes comprises:
classifying the letterform into a first initial letterform class associated with a letterform class group comprising at least the first initial letterform class and a second initial letterform class; and
merging the initial letterform class with another initial letterform class to form the one of the plurality of letterform classes.

13. The method of claim 5, wherein classifying the particular letter into the one of a plurality of letterform classes comprises generating the one of the plurality of letterform classes.

14. The method of claim 5, further comprising:
determining, for each of others of the plurality of letters, a corresponding set of letter properties comprising at least one corresponding dependent letter property and at least one corresponding independent letter property, wherein each of the at least one corresponding dependent letter property is dependent on another letter of the plurality of letters and each of the at least one corresponding independent letter property is independent of all other letters of the plurality of letters; and
classifying each of the others of the plurality of letters into one of the plurality of letterform classes based on the corresponding set of letter properties.

15. A system comprising:
a memory configured to store an image file representing an image comprising text; and
a processing device coupled to the memory, the processing device configured to:
determine a plurality of portions of the image respectively corresponding to a plurality of letters of the text;
determine, for a first letter of the plurality of letters, a set of letter properties comprising at least one dependent letter property, wherein each of the at least one dependent letter property is dependent on another letter of the plurality of letters; and
classify the first letter into one of plurality of letterform classes based on the set of letter properties.

16. The system of claim 15, wherein the set of letter properties further comprises at least one independent letter property, wherein each of the at least one independent letter property is independent of all other letters of the plurality of letters.

17. The system of claim 15, wherein the at least one dependent letter property comprises at least one of an inter-letter property based, at least in part, on an adjacent letter or a letter-combination property based on a letter-combination of which the letter is a part.

18. The system of claim 15, wherein the set of letter properties comprises a slanted bounding box defined as a parallelogram that encompasses at least a threshold amount of pixels of the first letter.

19. The system of claim 15, wherein the processing device is further configured to determine, for the first letter, an inter-letter property based on the slanted bounding box and an adjacent letter of the plurality of letters.

20. The system of claim 15, wherein the processing device is further configured to:
determine a portion of the image corresponding to a non-textual element;
determine shape properties for the non-textual element; and
determine that the non-textual element is not a letter based on the shape properties.

* * * * *